(12) United States Patent
Collins (10) Patent No.: US 11,573,012 B2
(45) Date of Patent: Feb. 7, 2023

(54) HOT, TEMPERED, AND COLD WATER DELIVERY SYSTEMS

(71) Applicant: LegioGuard Pty Ltd, Alexandria (AU)

(72) Inventor: Andrew Collins, Warradale (AU)

(73) Assignee: LegioGuard Pty Ltd, Alexandria (AU)

( * ) Notice: Subject to any disclaimer, the term of this patent is extended or adjusted under 35 U.S.C. 154(b) by 879 days.

(21) Appl. No.: 16/342,507

(22) PCT Filed: Oct. 19, 2017

(86) PCT No.: PCT/AU2017/000225
§ 371 (c)(1),
(2) Date: Apr. 16, 2019

(87) PCT Pub. No.: WO2018/071956
PCT Pub. Date: Apr. 26, 2018

(65) Prior Publication Data
US 2020/0056791 A1   Feb. 20, 2020

(30) Foreign Application Priority Data
Oct. 19, 2016   (AU) .............................. 2016904243

(51) Int. Cl.
*F24D 17/00*   (2022.01)
*C02F 1/02*    (2006.01)

(52) U.S. Cl.
CPC ............ *F24D 17/0073* (2013.01); *C02F 1/02* (2013.01); *F24D 17/0078* (2013.01);
(Continued)

(58) Field of Classification Search
None
See application file for complete search history.

(56) References Cited

U.S. PATENT DOCUMENTS 7,298,968 B1 *   11/2007   Boros ................. F24D 19/1051
                                                         392/494
2002/0189173 A1 *  12/2002  Staschik ................. F24H 1/08
                                                         52/79.1

FOREIGN PATENT DOCUMENTS

GB   2 230 256 A    10/1990
NL   1024796 C2     5/2005
(Continued)

OTHER PUBLICATIONS

International Search Report and Written Opinion dated Jan. 22, 2018, issued in corresponding International Application No. PCT/AU2017/000225, filed Oct. 19, 2017, 13 pages.

*Primary Examiner* — Richard C Gurtowski
(74) *Attorney, Agent, or Firm* — Christensen O'Connor Johnson Kindness PLLC (57) ABSTRACT

A tempered hot water delivery system configured to prevent or reduce colonisation of Legionella bacteria in tempered water delivered from the system to one or more outlets in a facility. The system comprises: a thermostatic mixing valve comprising; a hot water inlet for connection to a supply of hot water at a temperature of at least 60° C., a cold water inlet for connection to a supply of cold water, a tempered water outlet for supplying tempered water obtained from mixing the supplied hot water and cold water to provide tempered water at a temperature of between 36° C. to about 53° C. to at least one tempered water outlet of a facility, a recirculating inlet for connection to a recirculating water line circuit; and a recirculating water line circuit comprising a circulating return line connected to a circulating return outlet from the facility and to a water inlet feed line for connection to an inlet of a water heater and storage tank for providing the supply of hot water, the recirculating water line circuit further comprising a thermostatic element configured to introduce hot water to the recirculating water line circuit to
(Continued)

maintain the temperature of water in the recirculating water line circuit during periods of little or no draw-off.

3 Claims, 6 Drawing Sheets

(52) U.S. Cl.
CPC .... *C02F 2201/005* (2013.01); *C02F 2209/02* (2013.01); *C02F 2303/04* (2013.01); *F24D 2220/0214* (2013.01); *F24D 2220/0221* (2013.01); *F24D 2220/06* (2013.01); *F24D 2220/08* (2013.01); *F24D 2220/209* (2013.01)

(56) References Cited

FOREIGN PATENT DOCUMENTS

| WO | 95/29127 A1 | 11/1995 |
|---|---|---|
| WO | 2005/056481 A1 | 6/2005 |

\* cited by examiner

HOT, TEMPERED, AND COLD WATER DELIVERY SYSTEMS

PRIORITY DOCUMENTS

The present application claims priority from Australian Provisional Patent Application No. 2016904243 titled "IMPROVEMENTS IN HOT, TEMPERED AND COLD WATER DELIVERY SYSTEMS" and filed on 19 Oct. 2016, the content of which is hereby incorporated by reference in its entirety.

TECHNICAL FIELD

The present invention relates to hot water systems for providing hot, tempered and cold water in residential and commercial facilities.

BACKGROUND

Throughout Australia and countries worldwide there is a requirement for facilities, such as hospitals, medical clinics, aged care facilities, childcare facilities, and mental health facilities, to provide tempered hot water (sometimes referred to as "warm water") for the purpose of reducing the risk of scalding and burns attributed to high temperature hot water. The requirements are outlined in AS/NZ3500.

This requirement for tempered water (whilst reducing the likelihood of scalding) provides the ideal temperature for the colonisation of Legionella bacteria, the causative agent for Legionellosis or Legionnaires disease. When water containing Legionella is aerosolised through processes such as showering, there is a risk that it can be inhaled and Legionellosis can be the result.

The provision of safe and reliable hot, tempered and cold water obviously becomes paramount when addressing this requirement.

Existing systems available across the globe for the provision of tempered water are generally warm water systems (where delivered water is heated from ambient to circa 45° C.) or systems with multiple thermostatic mixing valves (TMVs) which deliver tempered water to up to six sanitary fixtures (basins, showers and the like). More recent designs have tended toward 'point of contact' TMVs requiring one at each outlet. These systems have various shortcomings and inherent problems, either from inadequacies of current technology, overly complicated system designs, prohibitive system costs, difficult installation parameters or poorly managed maintenance procedures.

There is thus a need to provide a solution that can overcome most of, or all of these existing issues whilst providing safer delivery of tempered water and sanitised chilled water.

SUMMARY

To date, there is no known system available which can guarantee delivery of Legionella free tempered water to distribution systems and sanitary fixtures. In addition to providing Legionella free tempered water (i.e. 36-53° C.), embodiments of the water delivery system of the present disclosure deliver Legionella free hot (≥60° C.) and cold (5-25° C.) water.

According to a first aspect of the present disclosure, there is provided a tempered hot water delivery system configured to prevent or reduce colonisation of Legionella bacteria in tempered water delivered from the system to one or more outlets in a facility, the system comprising:
   a thermostatic mixing valve comprising;
      a hot water inlet for connection to a supply of hot water at a temperature of at least 60° C.,
      a cold water inlet for connection to a supply of cold water,
      a tempered water outlet for supplying tempered water obtained from mixing the supplied hot water and cold water to provide tempered water at a temperature of between 36° C. to about 53° C. to at least one tempered water outlet of a facility,
      a recirculating inlet for connection to a recirculating water line circuit; and
   a recirculating water line circuit comprising a circulating return line connected to a circulating return outlet from the facility and to a water inlet feed line for connection to an inlet of a water heater and storage tank for providing the supply of hot water, the recirculating water line circuit further comprising a thermostatic element configured to introduce hot water to the recirculating water line circuit to maintain the temperature of water in the recirculating water line circuit during periods of little or no draw-off.

According to a second aspect of the present disclosure, there is provided a hot or cold water storage tank, comprising:
   a water storage tank for storing heated or cooled water;
   one or more heat transfer pipe(s) within the water storage tank, each heat transfer pipe(s) comprising an inlet and an outlet accessible externally from the water storage tank and defining a heated or cooled water path between the inlet and the outlet, wherein heat transfer occurs from heated water in the heat transfer pipe(s) to water in the storage tank or from water in the storage tank to chilled water in the heat transfer pipe(s) and wherein each inlet and outlet comprise an inlet and outlet aperture, respectively, said apertures configured so that heated or chilled water in the heat transfer pipe(s) is in fluid communication with water in the tank.

According to a third aspect of the present disclosure, there is provided a hot, tempered and sanitised cold water delivery system configured to prevent or reduce colonisation of Legionella bacteria in hot, tempered and cold water delivered from the system to one or more hot, tempered or cold water outlets in a facility, the system comprising a thermostatic mixing valve, a heat exchanger, a cold water storage tank and a hot water storage tank for storing water at a temperature of at least 60° C., the heat exchanger comprising:
   a cold water inlet for connection to a continuous supply of municipal cold water, a warmed water outlet for connection to an inlet of the hot water storage tank and a first fluid path between the cold water inlet and the warmed water outlet;
   a hot water inlet for connection to an outlet of the hot water storage tank, a cooled water outlet for connection to an inlet of the cold water storage tank and a second fluid path between the hot water inlet and the cooled water outlet;
   the first fluid path and the second fluid path configured to effect heat exchange between water flowing through each path; and
   the thermostatic mixing valve comprising:
      a hot water inlet for connection to an outlet of the hot water storage tank;
      a cold water inlet for connection to an outlet of the cold water storage tank; and
      a tempered water outlet for supplying tempered water obtained from mixing the supplied hot water and cold water to provide tempered water at a temperature of between 36° C. to about 53° C. to at least one tempered water outlet of a facility.

In certain embodiments of the third aspect, the cold water outlet from the cold water storage tank is also configured for connection to cold water sanitary fixtures in the facility. In these embodiments, a facility can have a hot water supply, tempered water supply and cold water supply in which all water has previously been thermally sanitised.

In certain embodiments of the third aspect, the thermostatic mixing valve 12 comprises the tempered hot water delivery system of the first aspect.

In certain embodiments of the third aspect, the hot water storage tank is a hot water storage tank of the first aspect.

In certain embodiments of the third aspect, the cold water storage tank is a cold water storage tank of the first aspect.

In certain embodiments of the third aspect, the hot water storage tank and cold water storage tank are in fluid connection with a heat pump system configured to cool water entering the cold water storage tank and to heat water entering the hot water storage tank.

BRIEF DESCRIPTION OF DRAWINGS

Embodiments of the present invention will be discussed with reference to the accompanying drawings wherein.

DESCRIPTION OF EMBODIMENTS

The present disclosure arises from the inventor's research into systems for delivering hot, tempered and/or cold water whilst preventing or minimising the risk of Legionella colonisation in the water.

In order to facilitate understanding of the present disclosure, certain frequently occurring terms will be described. The term "hot water" means water at a temperature of 60° C. or above. The term "warm water" means water heated from ambient to about 45° C. The term "tempered water" means blended hot and cold (i.e. about 20° C.) water. The abbreviation "TMV" stands for thermostatic mixing valve.

Figure 1:
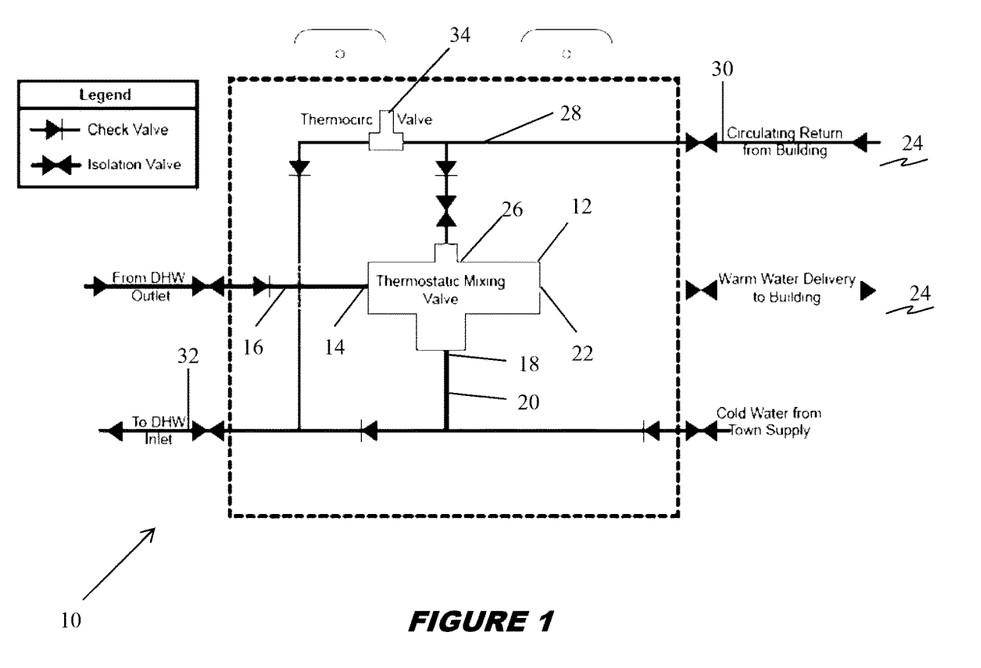
FIG. 1 is a schematic diagram of an embodiment of the tempered water delivery system of the first aspect.

A first embodiment is shown in FIG. 1. FIG. 1 shows a tempered water delivery system 10 configured to prevent or reduce colonisation of Legionella bacteria in tempered water delivered from the system to one or more outlets in a facility. The system comprises a thermostatic mixing valve 12. The thermostatic mixing valve 12 comprises a hot water inlet 14 for connection to a supply 16 of hot water at a temperature of at least 60° C. The thermostatic mixing valve 12 also has a cold water inlet 18 for connection to a supply 20 of cold water. The thermostatic mixing valve 12 also has a tempered water outlet 22 for supplying tempered water at a temperature of from about 36° C. to about 53° C. obtained from mixing the supplied hot water and cold water to at least one tempered water outlet of a facility 24. The thermostatic mixing valve 12 also has a recirculating inlet 26 for connection to a recirculating water line circuit 28.

The tempered water delivery system 10 includes a recirculating water line circuit 28 comprising a circulating return line 30 connected to a circulating return outlet from the facility 24 and to a water inlet feed line 32 for connection to an inlet of a hot water storage tank (not shown) for providing the supply of hot water. The recirculating water line circuit 28 further comprises a thermostatic element 34 configured to introduce hot water to the recirculating water line circuit 28 to maintain the temperature of water in the recirculating water line circuit during periods of little or no draw-off.

The tempered water delivery system 10 shown in FIG. 1 provides the best possible risk reduction where existing warm water systems are being upgraded, and the existing pipework and fixtures are being retained. Previously, systems may not have heated water above delivery temperature (circa 45° C.).

The tempered water delivery system 10 stores water at temperatures in excess of 60° C. (thus thermally sanitising it), and delivers water at an adjustable range of from about 36° C. to about 53° C.

Tempering is achieved utilising the thermostatic mixing valve 12, which incorporates a unique fourth port allowing circulating water to return to the loop. The thermostatic element 34 maintains loop temperature during periods of little or no draw-off. To recover the heat losses inherent in all circulating systems, the thermostatic element 34 constantly introduces hot water to the loop via the hot tank (not shown) through inlet 32, and respectively into connection 14 and out of connection 22. In effect, this ensures the entire volume of the loop is eventually returned to tank over a short period of time (dependent on amount of thermal loss), thus thermally sanitising the loop.

Manufacture and assembly of the tempered water delivery system 10 and the thermostatic mixing valve 12 can be carried out using standard components and techniques known to the person skilled in the art. For example, inlets and outlets 14, 18, 22 and 26 using suitable unions and nipples. Check valves may be positioned adjacent each inlet and outlet. The TMV may be adapted from a commercially available TMV by forming a fourth port for the recirculating inlet 26. Valves, bushes, washers, elbows, unions, nipples, adapters, etc can be used as appropriate. The circulating return line 30 can be formed from any suitable pipe including copper, stainless and cross-linked polyethylene (PEX or XLPE) pipes.

Figure 2:
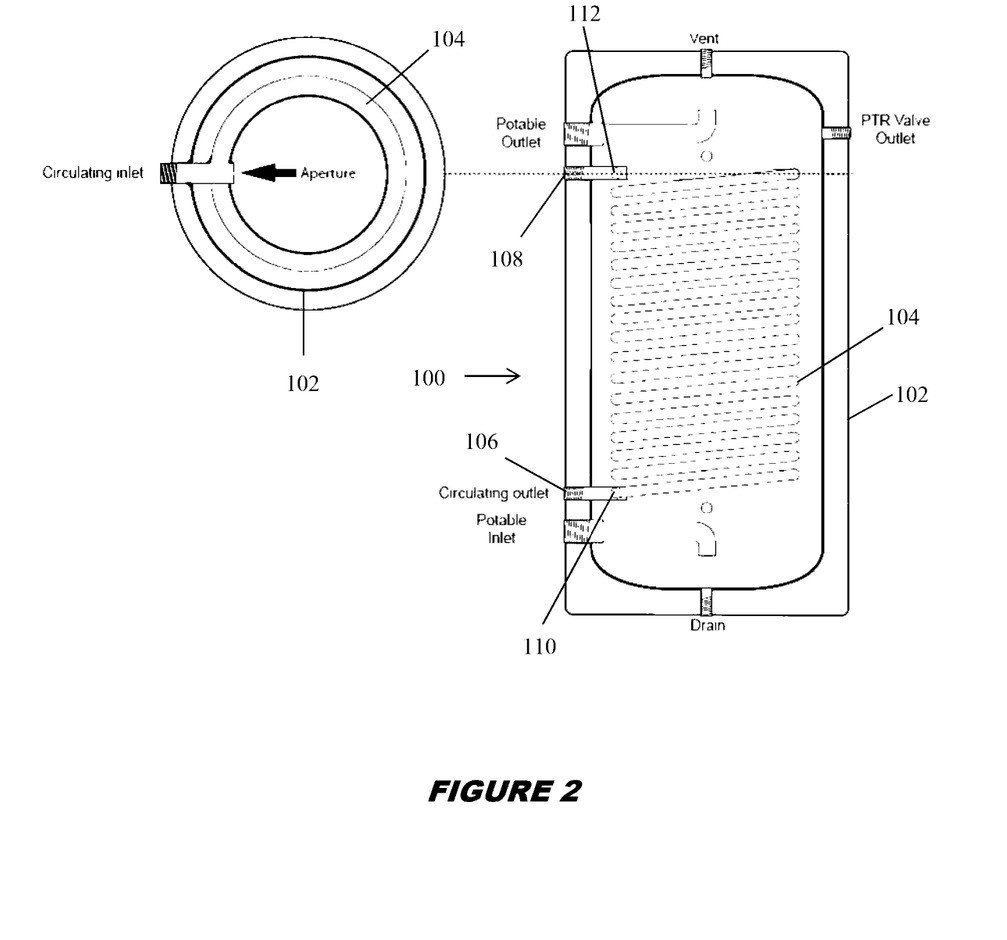
FIG. 2 shows a part cross sectional top view (left) and a part cross sectional side view of an embodiment of the hot or cold water storage tank of the second aspect.

A second aspect of the present disclosure is shown in FIG. 2. FIG. 2 shows a hot or cold water storage tank 100. The hot or cold water storage tank 100 comprises an insulated water storage tank 102 for storing heated or cooled water. One or more heat transfer pipe(s) 104 are located within the water storage tank 102. In the illustrated embodiment there is one single coiled heat transfer pipe. However it is contemplated that any number of heat transfer pipes could be located in the tank 102. Each heat transfer pipe 104 comprises an inlet (or outlet) 106 and an outlet (or inlet) 108 accessible externally from the water storage tank 102 and defining a heated or cooled water path between the inlet 106 and the outlet 108. Heat transfer occurs from heated water in the heat transfer pipe(s) 104 to water in the storage tank 102 or from chilled water in the heat transfer pipe(s) 104 to water in the storage tank 102. Each inlet 106 and outlet 108 has an inlet and outlet aperture 110 and 112, respectively. The apertures 110 and 112 are configured so that heated or chilled water in the heat transfer pipe(s) 104 is in fluid communication with water in the tank 102. Apertures 110 and 112 may be drilled in the end of a monoblock spigot where the heat transfer pipe 104 may be welded, or in the side of a cylindrical pipe fitting where the heat transfer pipe 104 is welded in the end.

The inlet and outlet apertures 110 and 112 ensure potable water within the heat transfer pipe(s) 104 is at the same mains pressure as the potable water within the water storage tank 102. Additionally, the inlet and outlet apertures 110 and 112 remove the need for complex air bleed systems, as any air can be expelled via outlets downstream from the water storage tank. Circulating volumes of potable water through the heat transfer pipe(s) 104 also cannot de-stratify the potable water within the water storage tank 102, due to the size of the apertures. The size of the apertures 110 and 112 may vary, depending on storage tank 102 volume, and heat transfer pipe 104 diameter. Generally, the apertures 110 and 112 can be from about 3 mm in diameter to about 8 mm in diameter.

Traditional coil in tank design has kept the fluid within the coil separate to potable water within the storage cylinder. This has been desirable for many reasons, notwithstanding the ability to use different heating mediums excluded from the potable water. Currently, where potable water has been heated via an external source, such as heat pumps or instantaneous gas, the potable water has been circulated through the cylinder without internal heat transfer coils.

Current coil in tank design requires separate hydraulic circuitry for heating a medium, which is then exchanged to the potable water within the cylinder. In instances where this medium is not potable water, this design may be desirable. However, where the heated medium is potable water, these separate circuitries require complicated header tanks and bleed systems, as it is not generally subjected to mains pressure. This medium is also subject to degradation and infection from in-water and airborne bacteria.

These systems are complex in design and require constant maintenance.

Alternatively, potable water is circulated directly through the cylinder without coils. On the surface, this design seems acceptable, but in reality is not effective in providing thermally sanitised hot water. Many designs have extremely high flow volumes via the inlet and outlet ports. This excessive volume destratifies the water in the tank, and the potable water drawn off can be significantly lower in temperature than deemed safe to sanitise potable water effectively. Reducing the flow rates to allow stratification significantly impairs the efficiency of the system.

The desirable outcome of the hot or cold water storage tank 100 of the present disclosure is the outlet temperature of the potable water from the tank 102 is much more stable and will remain at temperatures high enough for thermal sanitation.

The hot or cold water storage tank 100 can be formed using any suitable material. The tank 100 can be any suitable size depending on the application, such as (but not limited to) 600L, 800L, and 1000L. The tank 100 may comprise an inner tank that is duplex and an outer shell. The tank and shell may be formed from an appropriate metal, such as stainless steel (e.g. SUS304). The heat transfer pipe 104 may be formed from a material suitable for heat transfer, such as stainless steel (e.g. SUS316L). Inlets, outlets, vents, etc on the tank 100 may be formed from standard fittings. The tank may be thermally insulated using suitable insulating material as is known in the art. One or more temperature sensors may be positioned within the tank to monitor water temperature in the tank. The tank 100 may also have a heating element, such as a 3 kW heating element to assist in heating water in the tank 100 and/or maintaining the temperature of water in the tank 100.

Figure 3:
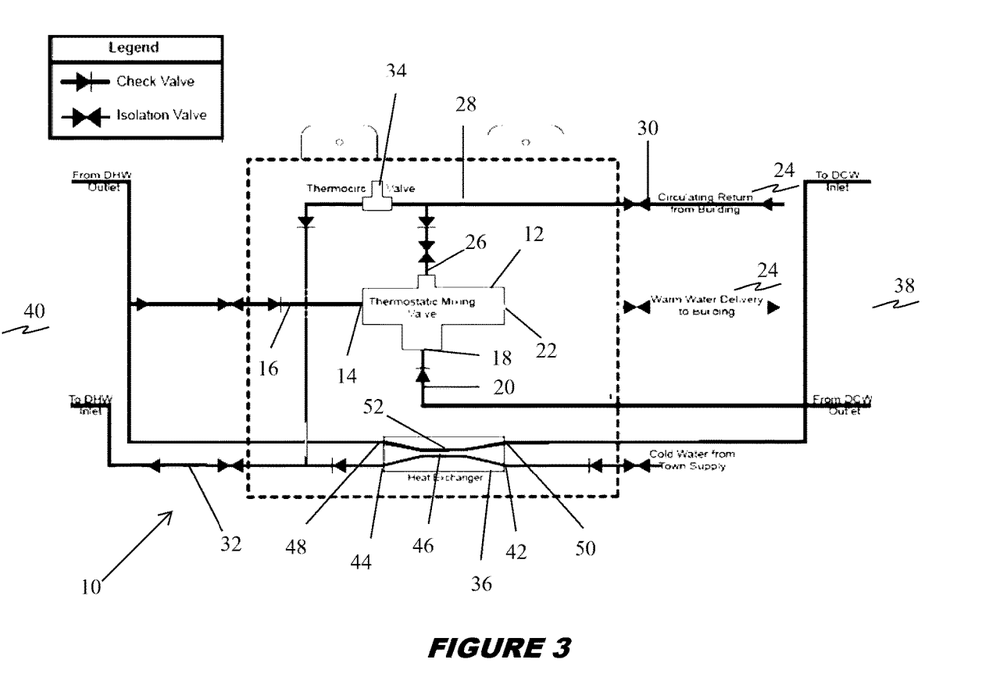
FIG. 3 is a schematic diagram of an embodiment of the hot, tempered and sanitised cold water delivery system of the third aspect.
Figure 4:
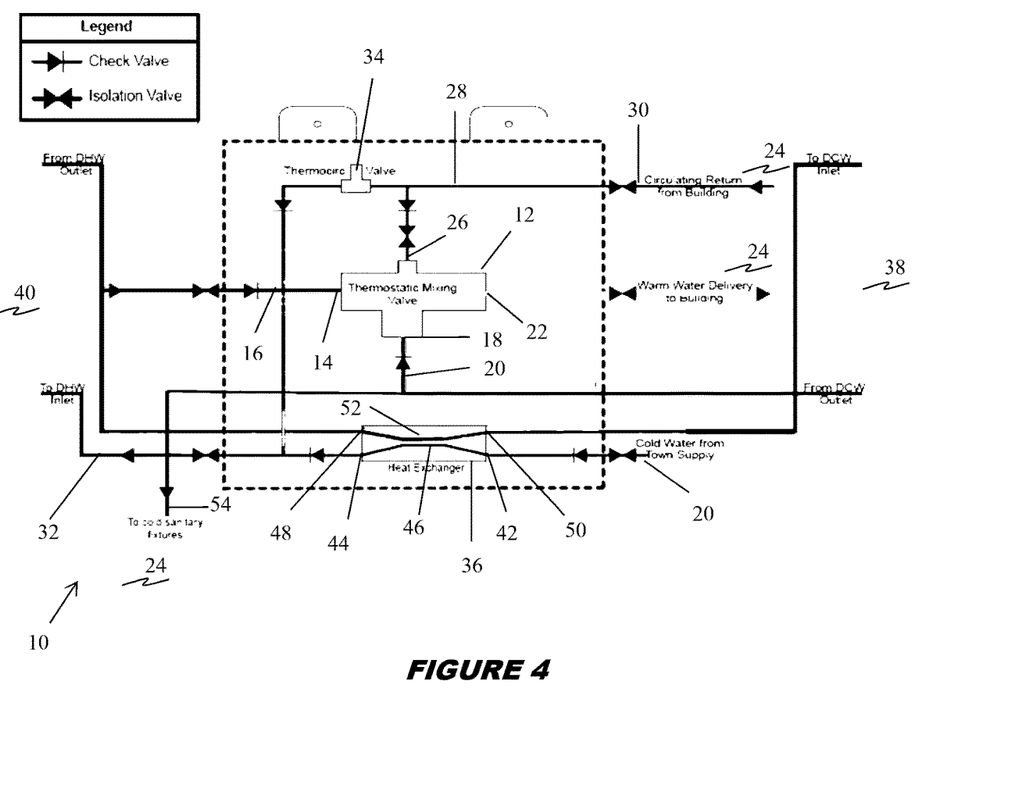
FIG. 4 is a schematic diagram of another embodiment of the hot, tempered and sanitised cold water delivery system of the third aspect.

A third aspect of the present disclosure is shown in FIGS. 3 and 4. The embodiment shown in FIGS. 3 and 4 has all of the features 12 to 34 of the tempered hot water delivery system shown in FIG. 1. However, it will be appreciated that the thermostatic mixing valve 12 of the system shown in FIGS. 3 and 4 may be a commercially available TMV having hot and cold water inlets and a tempered water outlet. The system shown in FIG. 3 includes an inbuilt heat exchanger 36. Specifically, the hot, tempered and cold water delivery system 10 shown in FIG. 3 comprises the heat exchanger 36, a cold water storage tank 38 and a hot water storage tank 40. The cold water storage tank 38 and hot water storage tank 40 may be the hot or cold water storage tank shown in FIG. 2. However, it will be appreciated that the cold water storage tank 38 and hot water storage tank 40 could take any other form, including commercially available hot water storage tanks 40 comprising a heating element and cold water storage tanks 38 comprising a cooling element.

The heat exchanger 36 comprises a cold water inlet 42 for connection to a supply of municipal cold water 20, a warmed water outlet 44 for connection to an inlet of the hot water storage tank 40, and a first fluid path 46 between the cold water inlet 42 and warmed water outlet 44. The heat exchanger 36 also comprises a hot water inlet 48 for connection to an outlet of the hot water storage tank 40, a cooled water outlet 50 for connection to an inlet of the cold water storage tank 38 and a second fluid path 52 between the hot water inlet 48 and the cooled water outlet 50. The first fluid path 46 and second fluid path 52 are configured to effect heat exchange between water flowing through each path. A cold water outlet from the cold water storage tank 38 is connected with the cold water inlet 18 of the thermostatic mixing valve 12.

The heat exchanger 36 passes the supply of cold water 20 and hot water from the hot water storage tank 40 past each other to preheat the incoming water to the hot water storage tank 40, and precool the incoming water to the cold water storage tank 38.

As the water is thermally sanitised in the hot water storage tank 40, colonisation of Legionella is not possible. This Legionella-free sanitised water is then transferred to the cold water storage tank 38 and cooled to between 5° C. and 20° C. The hot water from the hot water storage tank 40 and the cold water from the cold water storage tank 38 are then blended down to tempered delivery temperatures (e.g. about 45° C.) at the thermostatic mixing valve 12 to provide Legionella free tempered water wherein both the hot water and cold water have previously been sanitised.

The cold water storage tank 38 comprises one or more internal heat exchange pipe(s) through which chilled water passes so as to cool the water in the cold water storage tank 38. The chilled water for passing through the heat exchange pipe(s) may be produced by a heat pump. The heat exchange pipes may be in the form of a coil. In these embodiments, cold water in the cold water storage tank 38 may be cooled to between 5° C. and 20° C. via the heat exchange pipe(s).

In certain embodiments, the hot water storage tank 40 comprises one or more internal heat exchange pipe(s) through which heated water passes so as to heat the water in the hot water storage tank 40. The heated water for passing through the heat exchange pipe(s) may be produced by a heat pump. The heat exchange pipes may be in the form of a coil. In these embodiments, hot water in the hot water storage tank 40 may be heated to a minimum of 60° C. via the heat exchange pipe(s).

In certain embodiments, a single heat pump is used to produce the chilled water and the heated water for passing through the respective heat exchange pipe(s).

A third embodiment is shown in FIG. 4. The embodiment shown in FIG. 4 has all of the features 12 to 52 of the embodiment shown in FIG. 3. However, FIG. 4 shows a further embodiment in which the cold water outlet from the cold water storage tank 38 is also configured for connection to cold water sanitary fixtures 54 in the facility 24. In these embodiments, the facility 24 can have a hot water supply, tempered water supply and cold water supply in which all water has previously been thermally sanitised by heating to at least 60° C. Thus, the tempered water delivery system 10 shown in FIG. 4 provides Legionella free hot, tempered and cold water to sanitary fixtures and Legionella free water can be delivered to both sides of shower breaches, vanity suites and baths, reducing the risk of Legionella colonisation to almost zero.

Manufacture and assembly of the hot, tempered and cold water delivery system 10 of the third aspect can be carried out using standard components and techniques known to the person skilled in the art. For example, inlets and outlets 42, 44, 48, and 50 using suitable unions and nipples. Check valves may be positioned adjacent each inlet and outlet. The TMV may be adapted a commercially available TMV or it may be the thermostatic mixing valve 12 of the first aspect. Valves, bushes, washers, elbows, unions, nipples, adapters, etc can be used as appropriate. The lines connecting components of the system can be formed from any suitable pipe including copper, stainless and cross-linked polyethylene (PEX or XLPE) pipes.

Figure 5:
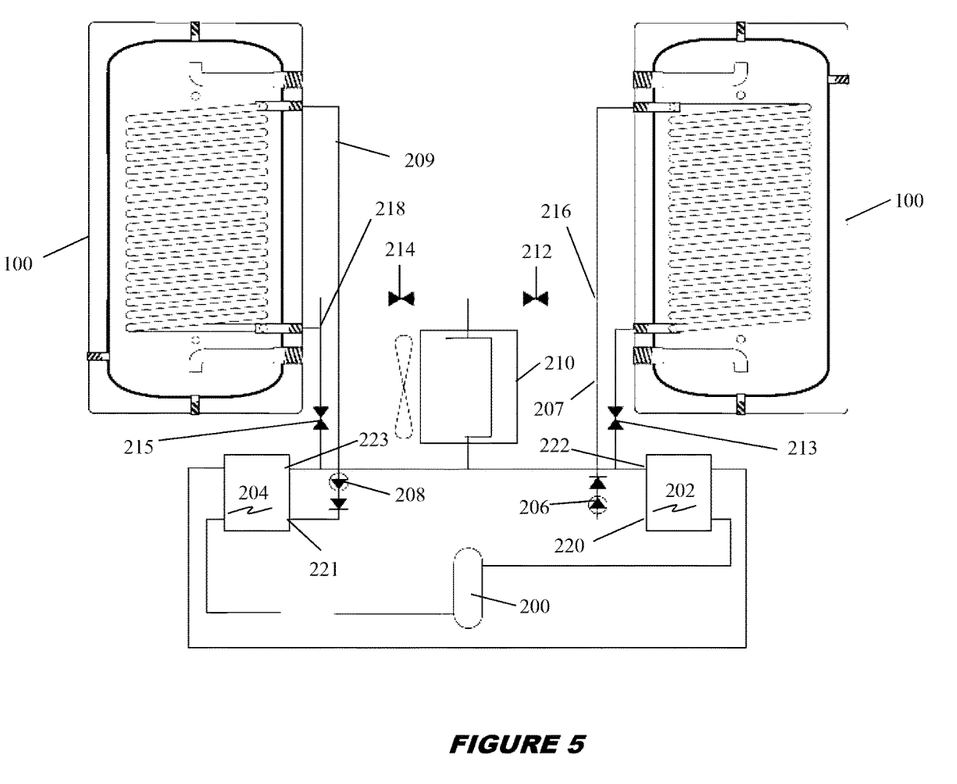
FIG. 5 is a schematic diagram of an embodiment of a heat pump system for use with the hot and cold water storage tanks of FIGS. 2 to 4.
Figure 6:
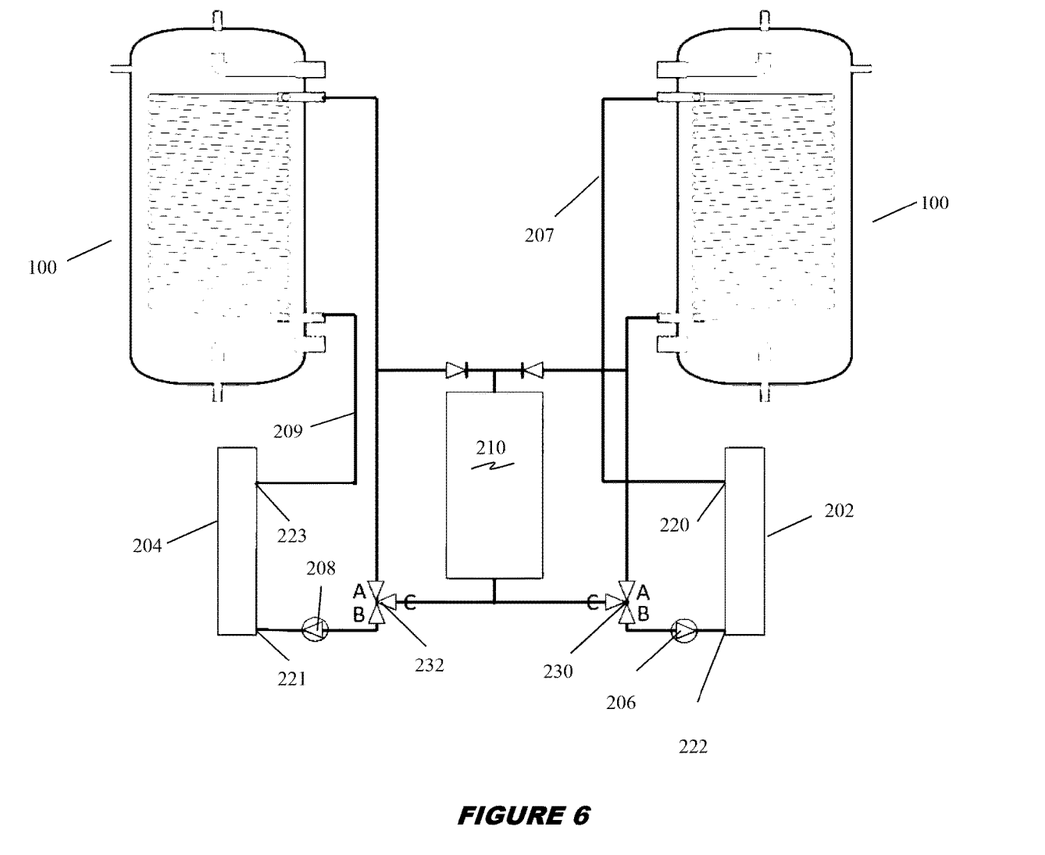
FIG. 6 is a schematic diagram of another embodiment of a heat pump system for use with the hot and cold water storage tanks of FIGS. 2 to 4.

Exemplary heat pump systems for use with the hot and cold water storage tank 100 of the second aspect and the hot, tempered and cold water delivery system of the third aspect are shown in FIGS. 5 and 6. It will be appreciated that the heat pump systems shown in FIGS. 5 and 6 are exemplary and it is contemplated that any suitable heat pump system could be used.

FIG. 5 shows a heat pump system, which comprises a traditional refrigeration system comprising a compressor 200, a condenser 202 in the form of a refrigerant to water heat exchanger, an evaporator 204 in the form of a refrigerant to water heat exchanger and a thermostatic expansion valve and/or orifice (not shown).

The refrigeration system is capable of providing high temperatures which enable heat exchange to provide water outlet temperatures from heat exchanger (condenser side) of up to 95° C. This will revert back to compressor exhaust temperatures of at least 105° C. Refrigerants used may be currently existing chlorinated fluorocarbons, hydrocarbons or $CO_2$, notwithstanding future developments in refrigerant technology.

A circulating pump 206 circulates water through hot water circulating pipework 207. This water is in fluid connection within storage tank 100. The circulating pump 206 normally circulates water through the storage tank when electromechanically operated isolating valve 212 is closed, and electromechanically operated isolating valve 213 is open. When electromechanically operated isolating valve 212 is opened and electromechanically operated isolating valve 213 is closed, the circulating pump circulates water through a water to air fan coil 210. Alternatively, an electromechanically operated three way isolating valve can be installed at tee junction 216 to perform the same task. A third option is also utilised as illustrated in FIG. 6. A circulating pump 206 circulates water through hot water circulating pipework 207. This water is in fluid connection within storage tank 100. The circulating pump 206 normally circulates water through the heat exchanger pipework and heat exchanger coils and through the three way valve A-B (port C is closed). When electromechanically operated three way valve is energised, flow path becomes B-C (port A is closed), and water is circulated via the heat exchanger coils then the water to air fan coil 210 and dumped to atmosphere.

A circulating pump 208 circulates water through cold water circulating pipework 209. This water is in fluid connection within storage tank 100. The circulating pump 208 normally circulates water through the storage tank when electromechanically operated isolating valve 215 is open, and electromechanically operated isolating valve 214 is closed. When electromechanically operated isolating valve 215 is closed and electromechanically operated isolating valve 214 is open, the circulating pump circulates water through a water to air fan coil 210. Alternatively, an electromechanically operated three way isolating valve can be installed at tee junction 218 to perform the same task. A third option is also utilised as illustrated in FIG. 6. A circulating pump 208 circulates water through cold water circulating pipework 209. This water is in fluid connection within storage tank 100. The circulating pump 206 normally circulates water through the heat exchanger pipework and heat exchanger coils and through the three way valve A-B (port C is closed). When electromechanically operated three way valve is energised, flow path becomes B-C (port A is closed), and water is circulated via the heat exchanger coils then the water to air fan coil 210 and dumped to atmosphere.

Circulating pump 206 is a variable speed pump controlled by a pulse width modulator (PWM) or similar technology to provide a constant outlet temperature (OT) 220 from the condensing heat exchanger 202 depending on required storage temperatures. For example, where set point (STP) storage temperature is required to be, say, 60° C., the outlet temperature may need to be, say, 65° C. so thermal dynamics can allow return temperature (RT) to achieve set point (STP) temperature. In this example, the differential temperature (DT) is 5° C., so it can be expressed thus: OT=STP+DT. A proportioning valve can be used as an alternative to circulating pump 206 to provide constant outlet temperature.

The return temperature (RT) to the inlet 222 of the condensing heat exchanger 202 when it reaches the set point (STP) will bring about the closure of electromechanically operated isolating valve 213 (by electronically controlled means not illustrated), and the opening of electromechanically operated isolating valve 212 (by electronically controlled means not illustrated). This will redirect circulating water in heat pipe circuitry 207 via the fan coil 210 and 'dump' the excess heat production to atmosphere.

Circulating pump 208 is a variable speed pump controlled by a pulse width modulator (PWM) or similar technology to provide a constant outlet temperature (OT) 223 from the evaporating heat exchanger 204 depending on required storage temperatures. For example where set point (STP) storage temperature is required to be, say, 20° C., the outlet temperature may need to be, say, 15° C. so thermal dynamics can allow return temperature (RT) to achieve set point (STP) temperature. In this example, the differential temperature (DT) is 5° C., so it can be expressed thus: OT=STP−DT. A proportioning valve can be used as an alternative to circulating pump 208 to provide constant outlet temperature.

The return temperature (RT) to the inlet 221 of the evaporating heat exchanger 204 when it reaches the set point (STP) will bring about the closure of electromechanically operated isolating valve 215 (by electronically controlled means not illustrated), and the opening of electromechanically operated isolating valve 214 (by electronically controlled means not illustrated). This will redirect circulating water in heat pipe circuitry 207 via the fan coil 210 and 'dump' the excess cold production to atmosphere.

In the event return temperatures (RT) at points 222 and 221 are simultaneously achieved (i.e. both tanks have reached desired temperature) the system will go into standby (i.e. compressor off) until set point (STP) in either tank falls below or above desired settings.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any faun of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

The invention claimed is:

1. A hot, tempered, and sanitized cold water delivery system configured to prevent or reduce colonization of Legionella bacteria in hot, tempered, and cold water delivered from the system to one or more hot, tempered, or cold water outlets in a facility, the system comprising:
   a thermostatic mixing valve;
   a cold water storage tank;
   a hot water storage tank for storing water at a temperature of at least 60° C.; and
   a heat exchanger, comprising:
      a cold water inlet for connection to a continuous supply of municipal cold water, a warmed water outlet for connection to an inlet of the hot water storage tank, and a first fluid path between the cold water inlet and the warmed water outlet; and
      a hot water inlet for connection to an outlet of the hot water storage tank, a cooled water outlet for connection to an inlet of the cold water storage tank, and a second fluid path between the hot water inlet and the cooled water outlet,
   wherein the first fluid path and the second fluid path are configured to affect heat exchange between water flowing through each of the first fluid path and the second fluid path,
   wherein the thermostatic mixing valve comprises:
      a hot water inlet for connection to an outlet of the hot water storage tank;
      a cold water inlet for connection to an outlet of the cold water storage tank; and
      a tempered water outlet for supplying tempered water obtained from mixing supplied hot water and supplied cold water to provide tempered water at a temperature of between 36° C. to about 53° C. to at least one tempered water outlet of a facility; and
      a recirculating inlet for connection to a recirculating water line circuit,
   wherein the recirculating water line circuit comprises a circulating return line connected to a circulating return outlet from the facility and to a water inlet feed line for connection to an inlet of the hot water storage tank, the recirculating water line circuit further comprising a thermostatic element configured to introduce hot water to the recirculating water line circuit to maintain the temperature of water in the recirculating water line circuit during periods of little or no draw-off, and
   wherein the outlet of the cold water storage tank is also configured for connection to a cold water sanitary fixture in the facility.

2. The hot, tempered and sanitized cold water delivery system of claim 1, wherein the hot water storage tank comprises a heat transfer pipe within the hot water storage tank, the heat transfer pipe having an inlet and an outlet accessible externally from the hot water storage tank and defining a heated water path between the inlet and the outlet of the heat transfer pipe, wherein heat transfer occurs from heated water in the heat transfer pipe to water in the hot water storage tank, and wherein the inlet and outlet of the heat transfer pipe comprise an inlet andoutlet aperture, respectively, the apertures configured such that heated water in the heat transfer pipe is in fluid communication with water in the hot water storage tank.

3. The hot, tempered and sanitized cold water delivery system of claim 2, wherein the cold water storage tank comprises a heat transfer pipe within the cold water storage tank, the heat transfer pipe having an inlet and an outlet accessible externally from the cold water storage tank and defining a cooled water path between the inlet and the outlet of the heat transfer pipe, wherein heat transfer occurs from water in the cold water storage tank to chilled water in the heat transfer pipe, and wherein the inlet and outlet of the heat transfer pipe comprise an inlet and outlet aperture, respectively, the apertures configured such that chilled water in the heat transfer pipe is in fluid communication with water in the cold water storage tank.

\* \* \* \* \*